United States Patent [19]

Mochizuki et al.

[11] Patent Number: 5,465,208

[45] Date of Patent: Nov. 7, 1995

[54] POWER SOURCE OUTPUT CONTROL SYSTEM OF VEHICLE WITH TRAVEL RESISTANCE DETECTOR

[75] Inventors: Kazuhiko Mochizuki; Hiromi Inagaki; Kenji Akuzawa, all of Wako, Japan

[73] Assignee: Honda Giken Kogyo Kabushiki Kaisha, Tokyo, Japan

[21] Appl. No.: 59,405

[22] Filed: May 11, 1993

[30] Foreign Application Priority Data

May 13, 1992 [JP] Japan ................... 4-120392

[51] Int. Cl.⁶ ........................................ G01P 15/00
[52] U.S. Cl. ................ 364/426.01; 364/426.04; 364/431.07; 364/431.03; 364/424.01; 180/197; 180/282; 180/179; 180/170; 123/349; 123/351; 123/352
[58] Field of Search ............... 364/426.02, 426.03, 364/426.01, 431.03, 424.05, 431.07, 426.04, 431.01, 424.01; 180/197, 282, 179, 174, 249, 339, 424.1, 170; 123/349, 351, 352, 399; 477/120, 131, 901, 904

[56] References Cited

U.S. PATENT DOCUMENTS

| | | | |
|---|---|---|---|
| 3,747,438 | 7/1973 | Toyoda et al. | 477/120 |
| 4,707,792 | 11/1987 | Naitou | 364/431.07 |
| 4,811,713 | 3/1989 | Shimada et al. | 123/399 |
| 4,984,545 | 1/1991 | Kaneyasu et al. | 364/426.04 |
| 5,021,958 | 6/1991 | Tokoro | 364/426.04 |
| 5,096,015 | 3/1992 | Akishino et al. | 180/179 |
| 5,121,657 | 6/1992 | Asada | 477/120 |
| 5,163,530 | 11/1992 | Nakamura et al. | 180/197 |
| 5,197,008 | 3/1993 | Itoh et al. | 364/426.01 |
| 5,245,542 | 9/1993 | Itoh et al. | 364/426.02 |

FOREIGN PATENT DOCUMENTS

| | | |
|---|---|---|
| 0427913B1 | 5/1991 | European Pat. Off. . |
| 3931327 | 8/1990 | Germany . |
| 60-164632 | 8/1985 | Japan . |
| 1-313636 | 12/1989 | Japan . |
| 2-102333 | 4/1990 | Japan . |

*Primary Examiner*—Kevin J. Teska
*Assistant Examiner*—Jacques H. Louis-Jacques
*Attorney, Agent, or Firm*—Armstrong, Westerman, Hattori, McLeland and Naughton

[57] ABSTRACT

A target torque is determined in a target torque determination device on the basis of an accelerator operation amount detected by an accelerator operation amount detector and power source output detected by a power source output detector. A target driving force is determined in a target driving-force determination device on the basis of driving force detected by a driving-force detector and the target torque. A target acceleration is determined in a target acceleration determination device on the basis of a travel resistance detected by a travel resistance detecting device and the target driving force. The operation of an actuator is controlled on the basis of an acceleration detected by an acceleration detecting device and the target acceleration. Thus, it is possible to provide a power source output control in accordance with the travel resistance, while simultaneously taking into consideration the current state of the power source and the responsiveness thereof.

2 Claims, 6 Drawing Sheets

POWER SOURCE OUTPUT CONTROL SYSTEM OF VEHICLE WITH TRAVEL RESISTANCE DETECTOR

BACKGROUND OF THE INVENTION

1. Field of the Invention

The present invention relates to a power source output control system for a vehicle.

2. Description of the Prior Art

As in the power source output control systems for vehicles, the following systems are conventionally known: a control system in which a target driving force is determined on the basis of an accelerator operation amount for controlling the opening degree of a throttle valve (Japanese Patent Application Laid-open No. 164632/85); a control system in which a target driving force is determined from an accelerator operation amount, an engine revolution number and an external load amount for controlling the opening degree of a throttle valve and the amount of fuel supplied (Japanese Patent Application Laid-open No. 313636/89); and a control system in which the opening degree of a throttle valve is controlled so that the target driving force is varied uniformly with respect to a variation in accelerator operation amount (Japanese Patent Application Laid-open No. 102333/90).

In such control systems in which the target driving force is determined on the basis of the accelerator operation amount, the engine revolution number, and the like, for controlling the power source output, however, when the travel resistance is varied due to the weight of the vehicle, the wind and the travelling on a sloping road, a vehicle's driver must conduct a correcting operation in accordance with the variation in travel resistance and this is troublesome.

SUMMARY OF THE INVENTION

Accordingly, it is an object of the present invention to provide a power source output control system for a vehicle, wherein a control of output from a power source can be carried out in accordance with the travel resistance, while taking the loaded state of the power source and the responsiveness into consideration.

To achieve the above object, according to the present invention, there is provided a power source output control system for a vehicle, comprising an actuator capable of changing the output from a power source, an accelerator operation amount detector for detecting an amount of operation of an accelerator operation member, a power source output detector for detecting the output from the power source, a target torque determination means for determining a target torque for the power source on the basis of the accelerator operation amount detected by the accelerator operation amount detector, as well as the power source output detected by the power source output detector, a driving-force detecting means for detecting a driving force being applied to a driven wheel, a target driving-force determination means for determining a target driving force to be applied to the driven wheel on the basis of the target torque determined in the target torque determination means as well as the driving force detected by the driving-force detecting means, a travel resistance detecting means for detecting a travel resistance acting on the vehicle, a target acceleration determination means for determining a target acceleration for the vehicle on the basis of the target driving force determined in the target driving-force determination means, as well as the travel resistance detected by the travel resistance detecting means, and an operation control means for controlling the operation of the actuator on the basis of the acceleration detected by the acceleration detecting means, as well as the target acceleration determined in the target acceleration determination means.

With the above arrangement, it is possible to provide a power source output control in accordance with the travel resistance, while simultaneously taking into consideration the current state of the power source and the responsiveness.

If the travel resistance detecting means is comprised of a travel speed detecting section for detecting a travel speed of the vehicle, and a travel resistance determination section for determining a travel resistance, with a predetermined function relation to the travel speed detected by the travel speed detecting section, it is possible to easily determine an appropriate travel resistance with a simple parameter.

The above and other objects, features and advantages of the invention will become apparent from the following description of a preferred embodiment, taken in conjunction with the accompanying drawings.

DESCRIPTION OF THE PREFERRED EMBODIMENT

The present invention will now be described, by way of a preferred embodiment, in connection with the accompanying drawings.

Figure 1:
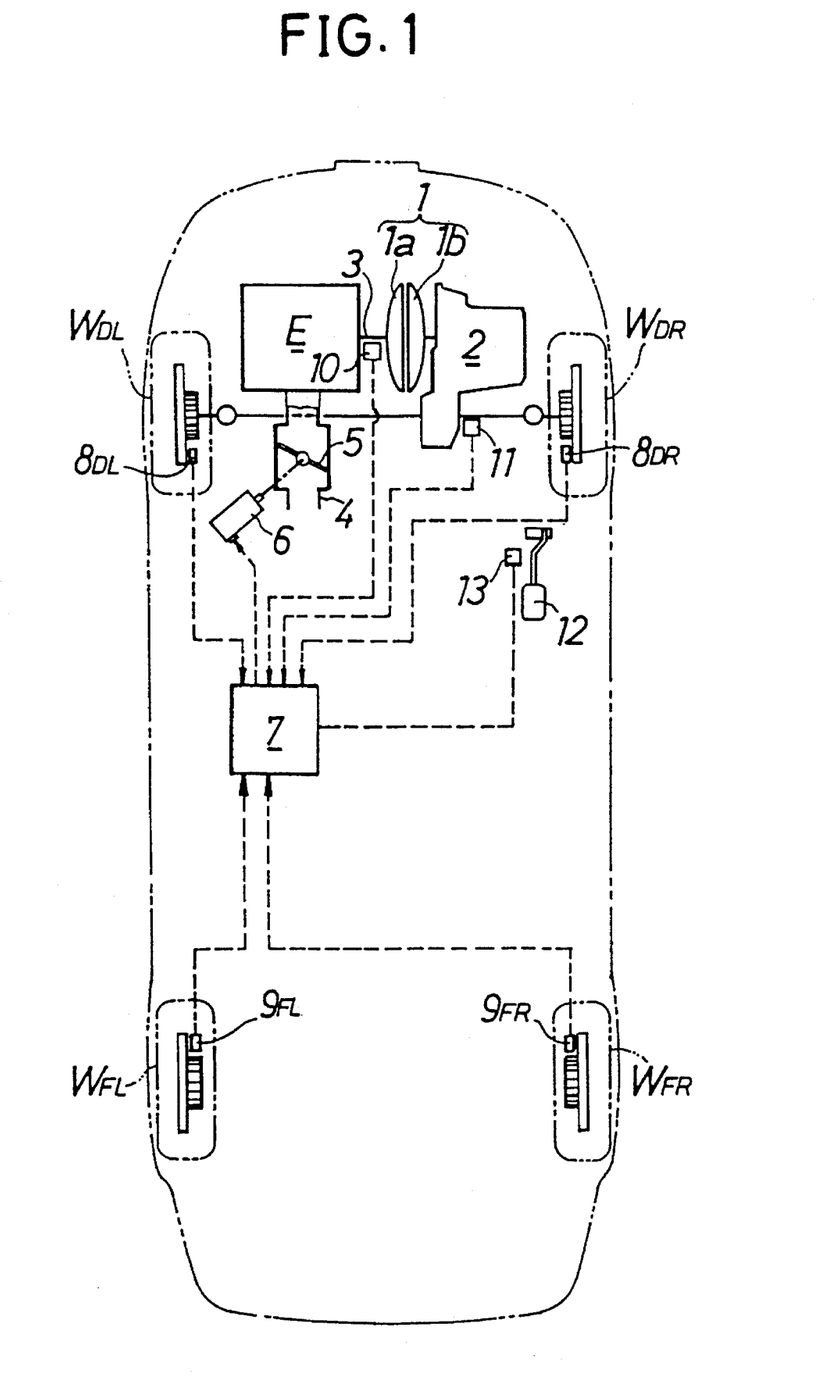
FIG. 1 is a diagram illustrating a driving system of a front wheel drive vehicle in a preferred embodiment of the present invention.

Referring first to FIG. 1, engine E, which is a power source mounted in a front wheel drive vehicle, is connected to transmission 2 through torque converter 1. Torque converter 1 includes pump $1a$ connected to crankshaft 3 of engine E, and turbine $1b$ connected to transmission 2. Power delivered from transmission 2 is transmitted to left and right driven wheels $W_{DL}$ and $W_{DR}$, which are left and right front wheels. Throttle valve 5 is openably and closably disposed in the middle of intake pipe 4 in engine E for adjusting the amount of an intake air flowing through intake pipe 4 to control the output from engine E. Throttle valve 5 is opened and closed by actuator 6, such as, a step motor, or the like.

The operation of actuator 6 is controlled by control unit 7. Connected to control unit 7 are follower wheel speed detectors $9_{FL}$ and $9_{FR}$ for detecting speeds of left and right follower wheels $W_{FL}$ and $W_{FR}$ which are left and right rear wheels, respectively; revolution number detector 10 serving as a power source output detector for detecting an engine revolution number $N_E$, as an indication representative of the output from engine E; gear position detector 11 for detecting a gear position in transmission 2; and accelerator operation amount detector 13 for detecting an operation amount of accelerator pedal 12, as an accelerator operation member operated by a driver of the vehicle for adjusting the output from engine E.

Figure 2:
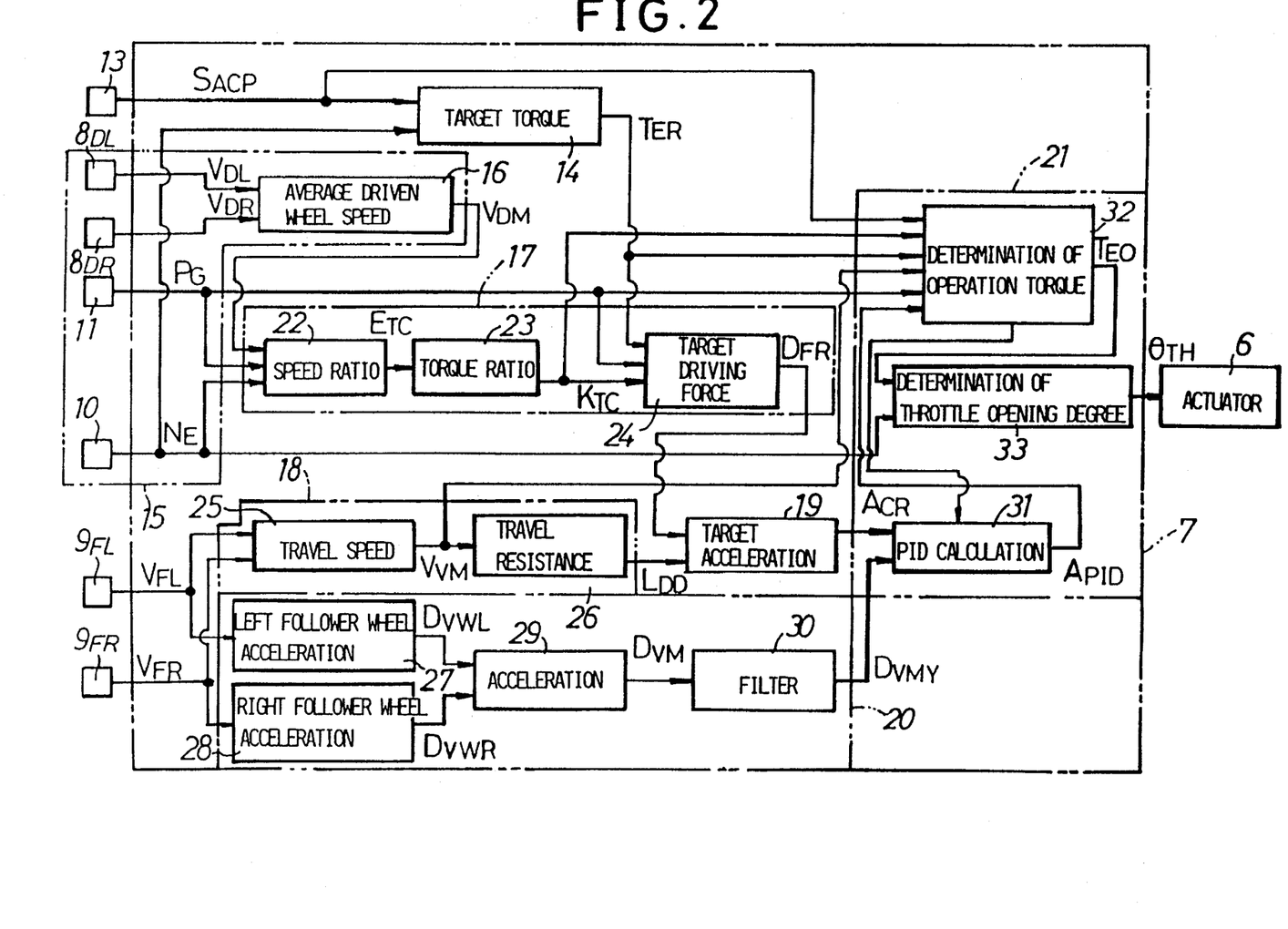
FIG. 2 is a block diagram illustrating the arrangement of a control unit.

Referring to FIG. 2, control unit 7 includes target torque determination means 14, for determining target torque $T_{ER}$ of engine E on the basis of accelerator operation amount $S_{ACP}$, detected by accelerator operation amount detector 13, as well as engine revolution number $N_E$, detected by revolution number detector 10; average driven-wheel speed calculating circuit 16, constituting driving-force detecting means 15, together with driven-wheel speed detectors $8_{DL}$ and $8_{DR}$, revolution number detector 10 and gear position detector 11; target driving-force determination means 17, for determining target driving-force $DF_{FR}$ to be applied to driven wheels $W_{DL}$ and $W_{DR}$, on the basis of target torque $T_{ER}$, determined in target torque determination means 14 as well as a driving force detected by driving-force detecting means 15; travel resistance detecting means 18, for detecting travel resistance $L_{DD}$ applied to the vehicle; target acceleration determination means 19 for determining target acceleration $A_{CR}$ of the vehicle on the basis of target driving-force $D_{FR}$, determined in target driving-force determination means 17, as well as travel resistance $L_{DD}$, detected by travel resistance detecting means 18; acceleration detecting means 20 for detecting acceleration $D_{VMY}$ of the vehicle; and operation control means 21 for controlling the operation of actuator 6 on the basis of acceleration $D_{VMY}$, detected by the acceleration detecting means 20, as well as target acceleration $A_{CR}$ determined in target acceleration determination means 19.

Figure 3:
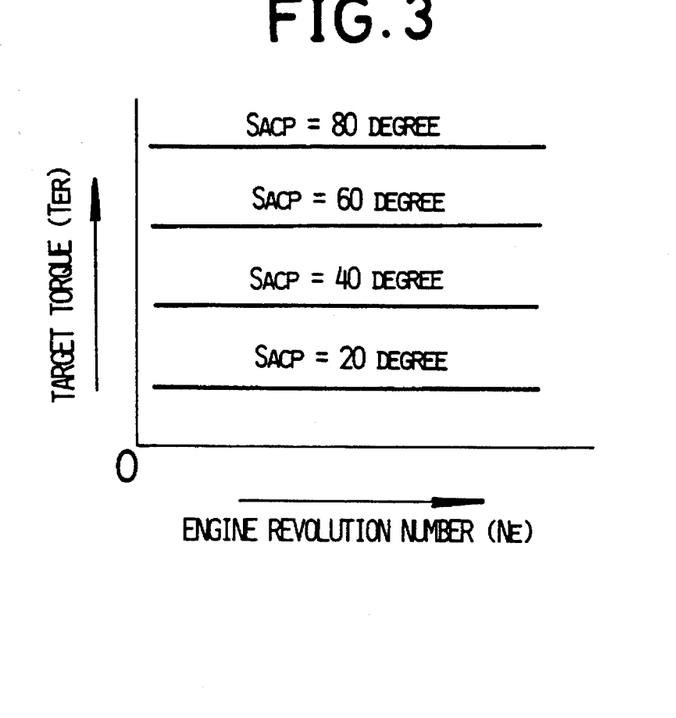
FIG. 3 is a diagram illustrating a pre-established map of target torque.
Figure 4:
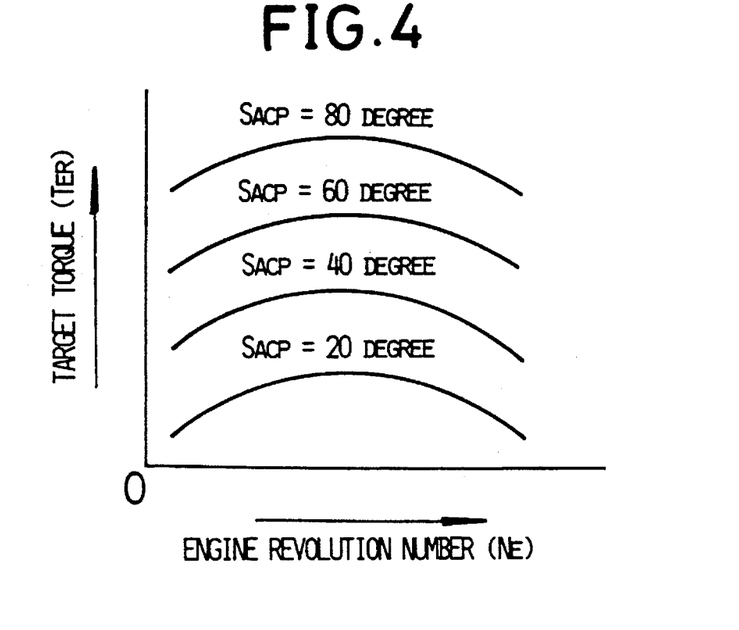
FIG. 4 is a diagram illustrating a modification to the pre-established map of target torque.

In target torque determination means 14, target torque $T_{ER}$ is determined such that it varies uniformly relative to variation in acceleration operation amount $S_{ACP}$. In this case, with a constant acceleration amount $S_{ACP}$, the target torque may be determined at a constant value irrespective of the variation in engine revolution number $N_E$, as shown in a map in FIG. 3, or may be determined such that it varies with the variation in engine revolution number $N_E$, as shown in FIG. 4.

In average driven-wheel speed calculating circuit 16 in driving-force detecting means 15, an average or mean driven-wheel speed $V_{DM}$ is provided by averaging driven-wheel speeds $V_{DL}$ and $V_{DR}$, detected by driven-wheel speed detectors $8_{DL}$ and $8_{DR}$.

Target driving-force determination means 17 includes speed ratio calculating circuit 22 for calculating speed ratio $E_{TC}$ of torque converter 1 on the basis of average driven-wheel speed $V_{DM}$ from average driven-wheel speed calculating circuit 16 in driving-force detecting means 15, engine revolution number $N_E$ detected by revolution number detector 10 and gear position $P_G$, detected by gear position detector 11; torque ratio calculating circuit 23 for calculating torque ratio $K_{TC}$ on the basis of speed ratio $E_{TC}$, determined in the speed ratio calculating circuit 22; and target driving-force calculating circuit 24 for calculating target driving-force $D_{FR}$ on the basis of target torque $T_{ER}$ determined in target torque determination means 14, gear position $P_G$ detected by gear position detector 11 in driving-force detecting means 15 and torque ratio $K_{TC}$, determined in torque ratio calculating circuit 23.

In speed ratio calculating circuit 22, speed ratio $E_{TC}$ of torque converter 1 is calculated according to the following expression (1):

$$E_{TC}=N_T/N_E \quad (1)$$

wherein $N_T$ is a revolutional speed of turbine $1b$ in torque converter 1. $N_T$ (rpm) is determined according to the following expression (2):

$$N_T=\{(V_{DM}\times 10^3)/60\}\times\{1/(2\times\pi\times R_T)\}\times R_{TG} \quad (2)$$

wherein the unit of driven-wheel speed $V_{DM}$ is km/hr; $R_T$ represents a radius (m) of each of driven wheels $W_{DL}$ and $W_{DR}$; and $R_{TG}$ represents a total gear ratio in a transmitting system including the transmission 2 and extending to driven wheels $W_{DL}$ and $W_{DR}$.

Moreover, total gear ratio $R_{TG}$ is dependent upon gear position $P_G$, for example, as given in Table 1.

TABLE 1

| Gear Position $P_G$ | Total Gear Ratio 10 $R_{TG}$ |
| --- | --- |
| first shift | 10.821 |
| second shift | 6.343 |
| third shift | 4.255 |
| fourth shift | 2.755 |

The total gear ratio $R_{TG}$, in reverse shift position, is set at the same value as in the first shift. In parking and neutral shift positions, the control of the output from engine E is not carried out and, hence, it is unnecessary to set total gear ratio $R_{TG}$.

In torque ratio calculating circuit 23, torque ratio $K_{TC}$ is calculated according to the following expression (3):

$$K_{TC}=1.75-0.81\times E_{TC} \quad (3)$$

but if torque ratio $K_{TC}$, obtained by the calculation, is smaller than 1 ($K_{TC}<1$), the torque ratio $K_{TC}$ is set at 1 ($K_{TC}=1$).

Further, in the target driving-force calculating circuit 24, a target driving-force $D_{FR}$ is calculated according to the following expression (4):

$$D_{FR}=(T_{ER}\times K_{TC}\times R_{TG}\times G_{KF})/R_T \quad (4)$$

wherein $G_{KF}$ represents a correcting factor.

Figure 5:
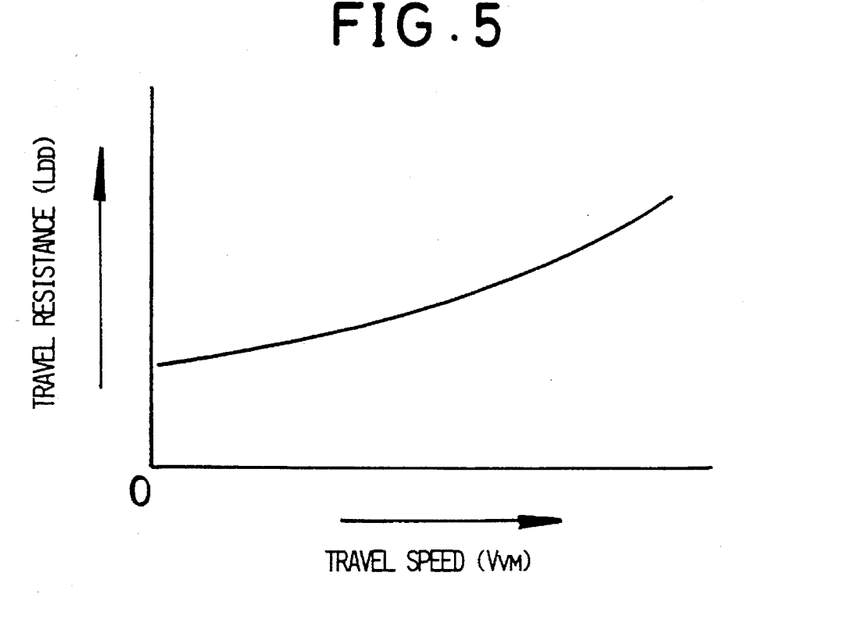
FIG. 5 is a diagram illustrating a pre-established map of travel resistance.

Travel resistance detecting means 18 includes travel speed detecting section 25 for detecting a travel speed $V_{VM}$ of the vehicle by an averaging calculation of follower wheel speeds $V_{FL}$ and $V_{FR}$, detected by follower wheel speed detectors $9_{FL}$ and $9_{FR}$; and travel resistance determination section 26, for determining travel resistance $L_{DD}$ by a predetermined function relation to travel speed $V_{VM}$ determined in travel speed detecting section 25. Travel resistance $L_{DD}$, having the predetermined function relation to travel speed $V_{VM}$, as shown in FIG. 5, is established on a map. In travel resistance determination section 26, travel resistance $L_{DD}$ is determined from such map.

In target acceleration determination means 19, target acceleration $A_{CR}$ is calculated according to the following expression (5), based on the target driving-force $D_{FR}$, travel resistance $L_{DD}$ and weight M of the vehicle.

$$A_{CR}=(D_{FR}-L_{DD})/M \quad (5)$$

Acceleration detecting means 20 includes left follower wheel acceleration calculating circuit 27 for calculating left follower wheel acceleration $D_{VWL}$ on the basis of left follower wheel speed $V_{FL}$ determined by left follower wheel speed detector $9_{FL}$; right follower wheel acceleration calculating circuit 28, for calculating right follower wheel acceleration $D_{VWR}$ on the basis of right follower wheel speed $V_{FR}$ determined by right follower wheel speed detector $9_{FR}$; average acceleration calculating circuit 29 for calculating average or mean acceleration $D_{VM}$ on the basis of follower wheel accelerations $D_{VWL}$ and $D_{VWR}$ determined in the follower wheel acceleration calculating circuits 27 and 28, respectively; and filter circuit 30 for filtering average or mean acceleration $D_{VM}$ from average acceleration calculating circuit 29.

In average acceleration calculating circuit 29, an average value of the follower wheel accelerations $D_{VWL}$ and $D_{VWR}$ is converted into gravity acceleration (G) by a calculation according to the following expression (6) to provide an average acceleration $D_{VM}$:

$$D_{VM} = \{(D_{VWL} + D_{VWR})/2\} \times (10^3/T_S) \times (5/18) \times (1/9.8) \quad (6)$$

wherein $T_S$ represents a sampling time (m sec).

If a value of average acceleration $D_{VM}$ just before the last time is represented by $D_{VM(k-2)}$; a value of last time is by $D_{VM(k-1)}$; and a current value is by $D_{VM(k)}$; as well as a value of the average acceleration $D_{VMY}$ of just before the last time after the filtering is by $D_{VMY(k-2)}$; a value of the last time is by $D_{VMY(k-1)}$; a current value is by $D_{VMY(k)}$, the current value $D_{VMY(k)}$ of the average acceleration $D_{VMY}$ after the filtering is determined in the filtering circuit 30 according to the following expression (7):

$$D_{VMY(k)} = D_{VMY(k-1)} \times A_1 + D_{VMY(k-2)} \times A_2 + D_{VM(k)} \times B_0 + D_{VM(k-1)} \times B_1 + D_{VM(k-2)} \times B_2 \quad (7)$$

wherein each of $A_1$, $A_2$, $B_0$, $B_1$ and $B_2$ is a constant, and if sampling time $T_S$ is 15 m sec., for example, $A_1=1.773744$, $A_2=-0.800084$, $B_0=0.006585013$, $B_1=0.013170030$, and $B_2=0.006585013$.

Operating control means 21 includes PID calculating circuit 31, operation torque determination circuit 32, and throttle opening degree determination circuit 33.

PID calculating circuit 31 calculates a PID control amount $A_{PID}$ on the basis of target acceleration $A_{CR}$, determined in the target acceleration determination means 19, and acceleration $D_{VMY}$, determined in the acceleration detector 20. In PID calculating circuit 31, a calculation is carried out according to the following expression (8):

$$A_{PID(k)} = G_{KK} \times (G_{KP} \times P_{(k)} + G_{KI} \times I_{(k)} + G_{KD} \times D_{(k)}) \quad (8)$$

wherein $P_{(k)} = A_{CR(k)} - D_{VMY(k)}$
$I_{(k)} = P_{(k)} + I_{(k-1)}$
$D_{(k)} = P_{(k)} - P_{(k-1)}$, and each of $G_{KK}$, $G_{KP}$, $G_{KI}$ and $G_{KD}$ is a constant. For example, $G_{KK}=1.0$, $G_{KP}=0.1$, $G_{KI}=0.01$, and $G_{KD}=0.0$. Moreover, the value of $I_{(k)}$ is obtained after it is limited so that $I_{MIN} \leq I_{(k)} \leq I_{MAX}$, wherein $I_{MIN}$ is $(-1.0)$, for example, and $I_{MAX}$ is $(1.0)$, for example.

In operation torque determination circuit 32, total gear ratio $R_{TG}$ (see Table 1) is determined on the basis of PID control amount $A_{PID(k)}$ determined in the PID calculating circuit 31, torque ratio $K_{TC}$ determined in torque ratio calculating circuit 23 in target driving-force determination means 17 and gear position $P_G$ determined in gear position detector 11. Further, in circuit 32, operation torque $T_{EO}$ is determined on the basis of target torque $T_{ER}$ determined in target torque determination means 14. More specifically, correction torque $T_{EC}$ is calculated according to the following expression (9) from PID control amount $A_{PID(k)}$, torque ratio $K_{TC}$, total gear ratio $R_{TG}$, vehicle weight M and radius $R_T$ of the driven wheels, and operation torque $T_{EO}$ is calculated from the following expression (10) from such correction torque $T_{EC}$ and target torque $T_{ER}$.

$$T_{EC(k)} = (A_{PID(k)} \times M \times R_T)/(K_{TC} \times R_{TG} \times G_{KF}) \quad (9)$$

$$T_{EO(k)} = T_{EC(k)} + T_{ER} \quad (10)$$

Moreover, travel speed $V_{VM}$ has been inputted from travel speed detecting section 25 in travel resistance detecting means 18 into operation torque determination circuit 32. And when travel speed $V_{VM}$ is smaller than a threshold value $V_{VGA}$, e.g., 10 km/hr, operation torque $T_{EO(k)}$ is determined at a value equal to $T_{ER}$ ($T_{EO(k)} = T_{ER}$). In this case, P, I and D members are cleared in PID calculating circuit 31.

Accelerator operation amount $S_{ACP}$ has been also inputted from accelerator operation amount detector 13 into operation torque determination circuit 32. When variation in accelerator operation amount $S_{ACP}$ is larger, i.e., when sudden operation of the accelerator pedal is conducted, a processing which will be described below is executed in operation torque determination circuit 32. That is, when the absolute value $|\Delta S_{ACP}|$ of a difference between the last and current values of accelerator operation amount $S_{ACP}$ is more than a given value $\Delta S'$, a torque deviation $D_{TE}$ is set at a value equal to $T_{EC(k)}$ ($D_{TE} = T_{EC(k)}$) at the time when the decision of the above fact is validated. While such decision is valid, operation torque $T_{EO(k)}$ is calculated according to the following expression (11):

$$T_{EO(k)} = T_{ER} + D_{TE} \quad (11)$$

Moreover, while the above-described processing is being executed, P, I and D members are left kept without renewing in PID calculating circuit 31. At an instant when the above-described decision is invalidated, or when accelerator operation amount $S_{ACP}$ becomes zero (0), such processing is terminated.

Further, in operation torque determination circuit 32, the limiting is carried out so that calculated operation torque $T_{EO}$ becomes a value in a range of $T_{EOMIN} \leq T_{EO} \leq T_{EOMAX}$. In this case, $T_{EOMAX}$ is set, for example, at $(-5.0)$, and $T_{EOMAX}$ is set, for example, at $(20.0)$.

Figure 6:
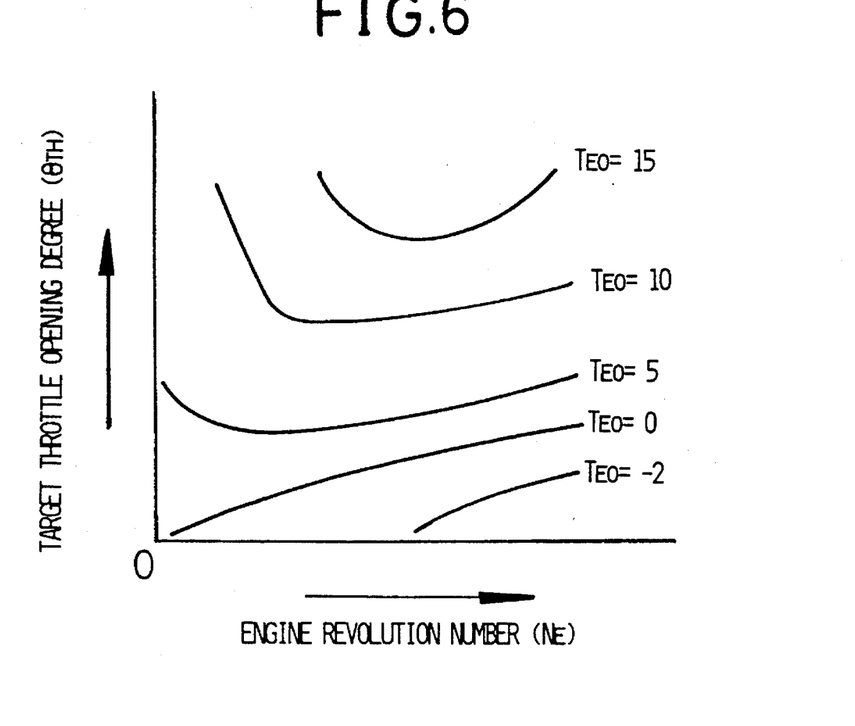
FIG. 6 is a diagram illustrating a pre-established map of target throttle opening degree.

In throttle opening degree determination circuit 33, target throttle opening degree $\theta_{TH}$ is found from a map previously established, as shown in FIG. 6, on the basis of engine revolution number $N_E$ detected by revolution number detector 10 and operation torque $T_{EO}$ determined in the operation torque determination circuit 32. The operation of actuator 6 is controlled in accordance with a control signal from throttle opening degree determination circuit 33, such that target throttle opening degree $\theta_{TH}$ is achieved.

Moreover, in throttle opening degree determination circuit 33, the limiting is carried out so that the calculated target throttle opening degree $\theta_{TH}$ becomes a value in a range of $\theta_{THMIN} \leq \theta_{TH} \leq \theta_{THMAX}$. In this case, $\theta_{THMIN}$ is set, for example, at $(0.0)$, and $\theta_{THMAX}$ is set, for example, at $(81.0)$.

The operation of this embodiment will be described below. Target torque $T_{ER}$ is determined in target torque determination means 14 on the basis of accelerator operation amount $S_{ACP}$ detected by accelerator operation amount detector 13 as well as engine revolution number $N_E$, detected by the revolution number detector 10. A driving force which is applied to driven wheels $W_{DL}$ and $W_{DR}$ is detected by driving-force detecting means 15, and target driving force $D_{FR}$, to be applied to the driven wheels $W_{DL}$ and $W_{DR}$, is determined in the target driving-force determination means 17 on the basis of such driving force and target torque $T_{ER}$. Moreover, a travel resistance acting on the vehicle is determined in travel resistance detecting means 18 on the basis of travel speed $V_{VM}$ of the vehicle. And target acceleration $A_{CR}$ of the vehicle is determined in target acceleration determination means 19 on the basis of such travel resistance $L_{DD}$ and target driving force $D_{FR}$. Thus, the operation of actuator 6 is controlled by operation control means 21 on the basis of acceleration $D_{VMY}$, determined in the acceleration detecting means 20, and the acceleration $A_{CR}$.

In this manner, target driving force $D_{FR}$ is determined from target torque $T_{ER}$, determined from the accelerator operation amount $S_{ACP}$ and the engine revolution number $N_E$, as well as the driving force being applied to driven wheels $W_{DL}$ and $W_{DR}$. And the operation of actuator 6, i.e., the opening and closing operation of throttle valve 5 is controlled, such that acceleration $D_{VMY}$ approaches target acceleration $A_{CR}$, obtained by subtraction of travel resistance $L_{DD}$ from target driving force $D_{FR}$. Therefore, it is possible to provide a proper control of the output from engine E, in accordance with the travel resistance $L_{DD}$, while taking the loaded state and responsiveness of the engine into consideration.

Moreover, when target driving force $D_{FR}$ and travel resistance $L_{DD}$ are equal to each other, target acceleration $A_{CR}$ is zero (0), and when a certain acceleration is reached, a uniform motion is achieved and thereafter maintained.

Travel resistance $L_{DD}$ is previously set so as to have a predetermined function relation in accordance with travel speed $V_{VM}$, and an appropriate travel resistance can easily be obtained with a simple parameter.

If a feedback control of acceleration is conducted when accelerator operation amount $S_{ACP}$ is suddenly varied, a disadvantage is encountered that an excessive behavior of the vehicle, such as, squirting, and diving may be produced to cause an adverse effect on detection value $D_{VMY}$, detected by the acceleration detecting means 20, resulting in a deviation from an actual acceleration of the vehicle, whereby a long time may be taken until the acceleration approaches target acceleration $A_{CR}$ and is stabilized. However, when accelerator operation amount $S_{ACP}$ is suddenly varied, a value resulting from the addition of deviation $D_{TE}$ to the target torque $T_{ER}$ is determined, as an operation torque $T_{EO}$, and the feedback control, based on the acceleration, is not carried out. Therefore, it is possible to avoid the adverse effect on the control, due to the excessive behavior of the vehicle in a transient state, and to conduct a control such that the acceleration promptly approaches the target acceleration $A_{CR}$.

The above-described series of controls may be carried out by a computer. The controlling procedure of such case is as shown in FIGS. 7 and 8.

Figure 7:
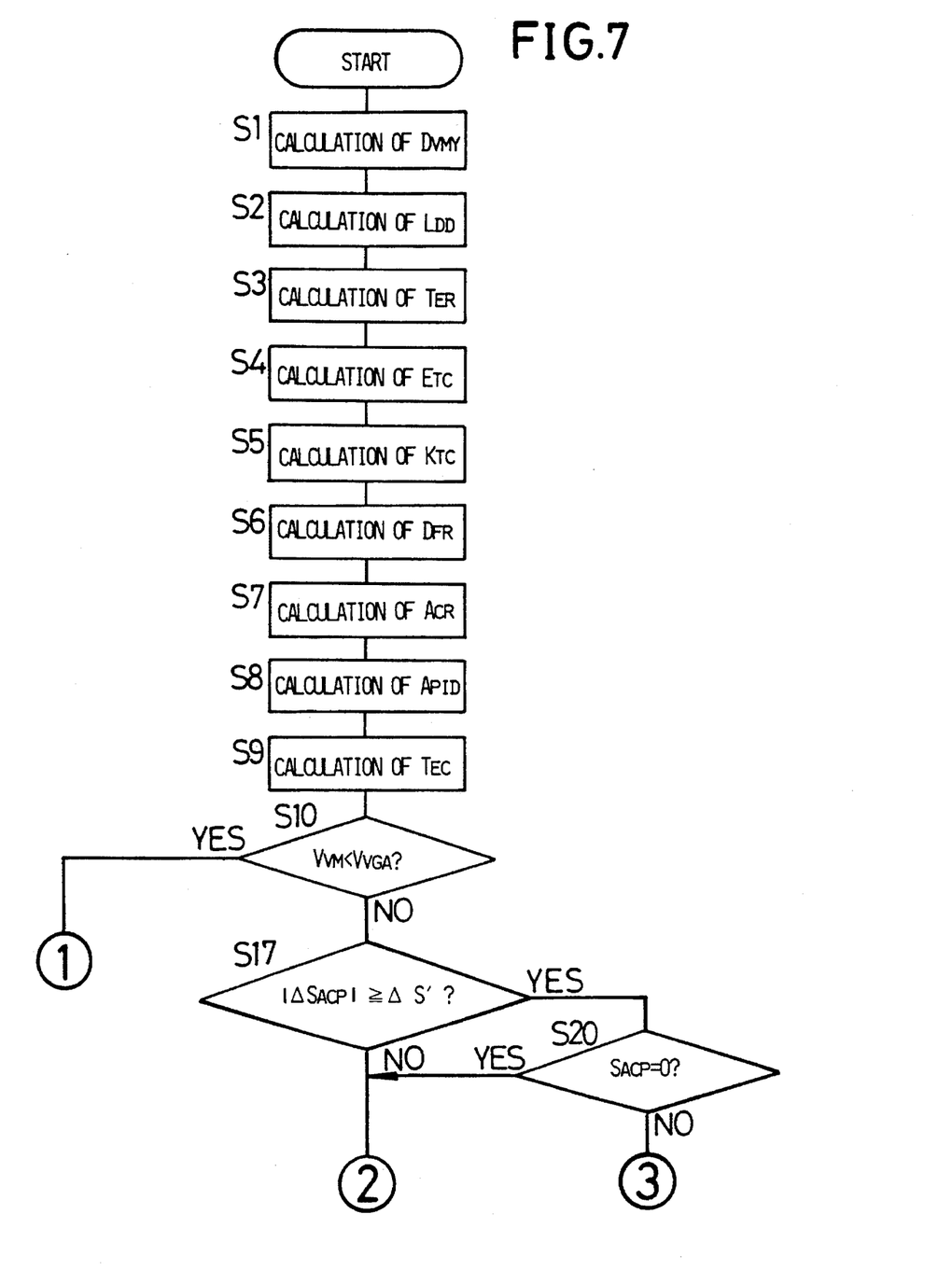
FIG. 7 is a flow chart illustrating a portion of a controlling procedure.
Figure 8:
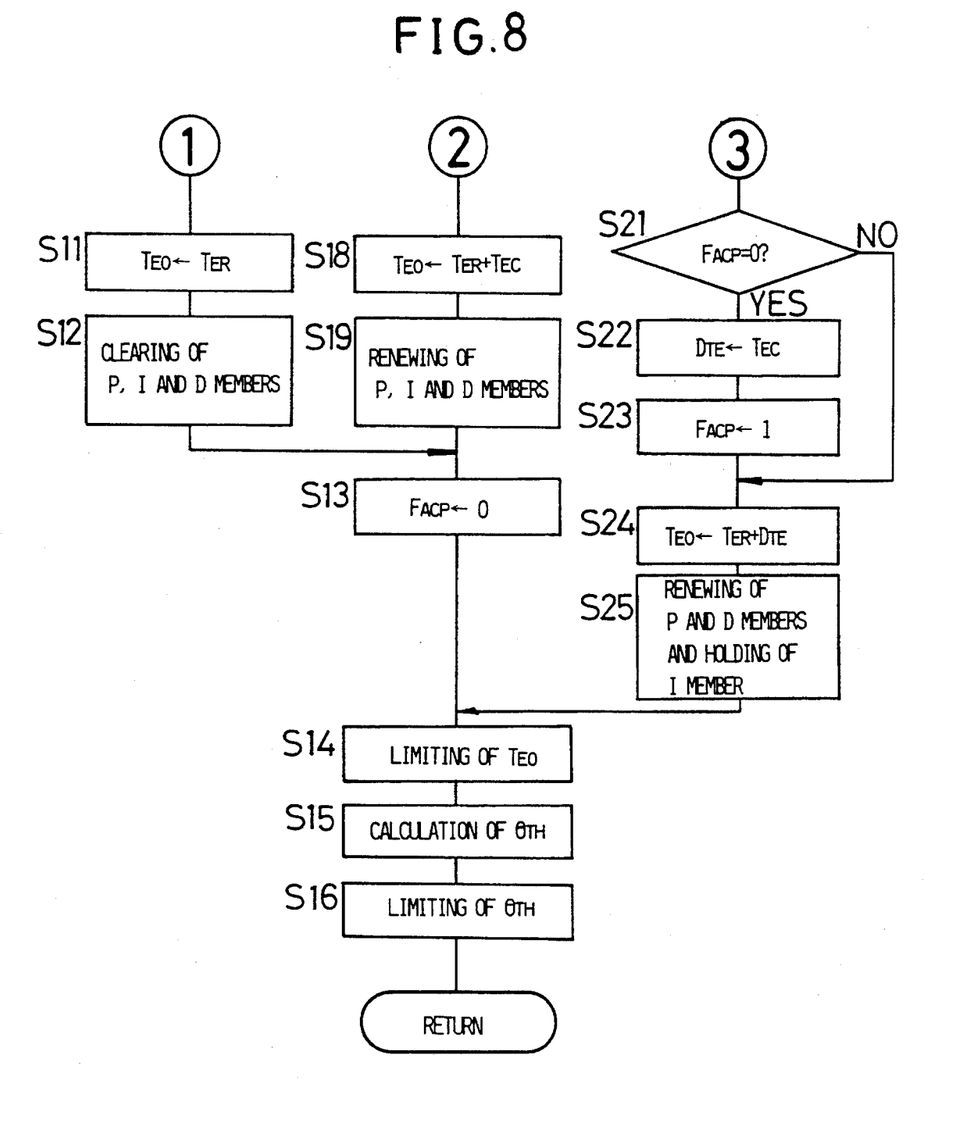
FIG. 8 is a flow chart illustrating the remaining portion of the controlling procedure.

Referring first to FIG. 7, at steps S1 to S9, the acceleration $D_{VMY}$, travel resistance $L_{DD}$, target torque $T_{ER}$, speed ratio $E_{TC}$, torque ratio $K_{TC}$, target driving force $D_{FR}$, target acceleration $A_{CR}$, PID control amount $A_{PID}$ and correction torque $T_{EC}$ are calculated, respectively.

At step S10, it is judged whether or not travel speed $V_{VM}$ is smaller than threshold value $V_{VGA}$. If it is decided that $V_{VM} < V_{VGA}$, the processing is advanced to step S11. At step S11, operation torque $T_{EO}$ is determined at a value equal to target torque $T_{ER}$. At a next step S12, P, I and D members in the PID calculation are cleared, and at step S13, flag $F_{ACP}$ is set at "0".

Further, at step S14, the limitation of operation torque $T_{EO}$ is carried out, and at step S15, target throttle opening degree $\theta_{TH}$ is calculated. At step S16, the limitation of target throttle opening degree $\theta_{TH}$ is carried out.

If it is decided, at step S10, that $V_{VM} \geq V_{VGA}$, it is judged at step S17 whether or not the absolute value $|\Delta S_{ACP}|$ of the difference between the last and current values of accelerator operation amount $S_{ACP}$ is equal to or more than the given value $\Delta S'$ ($|\Delta S_{ACP}| \geq \Delta S'$). If it is decided that $|\Delta S_{ACP}| < \Delta S'$, the processing is advanced to step S18 shown in FIG. 8.

At step S18, operation torque $T_{EO}$ is determined as ($T_{ER}+T_{EC}$). At step S19, P, I and D members in the PID calculation are renewed, progressing to step S13.

Thus, if travel speed $V_{VM}$ is equal to or more than threshold value $V_{VGA}$, and $|\Delta S_{ACP}|$ is smaller than $\Delta S'$, feedback control, based on the deviation between target acceleration $A_{CR}$ and detected acceleration $D_{VMY}$, is carried out.

If it is decided, at step S17, that $|\Delta S_{ACP}| \geq \Delta S'$, it is judged at step S20 whether or not acceleration operation amount $S_{ACP}$ is zero (0). If $S_{ACP}=0$, the processing is advanced to step S18. If $S_{ACP} \neq 0$, the processing is advanced to step S21.

At step S21, it is judged whether or not flag $F_{ACP}$ is zero (0). If $F_{ACP}=0$ (zero), deviation $D_{TE}$ is set at a value equal to correction torque $T_{EC}$ at step S22 and then, the flag $F_{ACP}$ is set at "1" at step S23, progressing to step S24. On the other hand, if it is decided, at step S21, that $F_{ACP} \neq 0$ (zero), the processing is advanced to step S24 bypassing steps S22 and S23.

At step S24, operation torque $T_{EO}$ is set as ($T_{ER}+D_{TE}$), and at step S25, P and D members, in the PID calculation expression, are renewed, while I member is held, progressing to step S14.

In this way, when sudden operation of the accelerator has been conducted, the feedback control, based on the acceleration, is not carried out until it is decided that such sudden operation is terminated, or until the accelerator operation amount becomes "0".

Although the embodiment of the present invention has been described in detail, it will be understood that the present invention is not intended to be limited to the above-described embodiment, and various modifications in design may be made without departing from the spirit and scope of the invention defined in the appended claims.

What is claimed is:

1. A power source output control system for a vehicle, comprising:

an actuator means for changing output from a power source;

an accelerator operation amount detector for detecting an amount of operation of an accelerator operation member;

a power source output detector for detecting output from said power source;

a target torque determination means for determining a target torque for said power source on the basis of said accelerator operation amount detected by said accelerator operation amount detector and said power source output detected by said power source output detector;

a driving-force detecting means for detecting a driving force being applied to a driven wheel of said vehicle;

a target driving-force determination means for determining a target driving force to be applied to said driven wheel on the basis of said target torque determined by said target torque determination means and said driving force detected by said driving-force detecting means;

a travel resistance detecting means for detecting a travel resistance acting on the vehicle;

a target acceleration determination means for determining a target acceleration from said vehicle on the basis of said target driving force determined by said target driving-force determination means and said travel resistance detected by said travel resistance detecting means;

an acceleration detecting means for detecting an acceleration of said vehicle; and an operation control means for controlling operation of said actuator on the basis of said acceleration detected by said acceleration detecting means and said target acceleration determined by said target acceleration determination means.

2. A power source output system of a vehicle according to claim 1, wherein said travel resistance detecting means comprises a travel speed detecting section for detecting travel speed of said vehicle, and a travel resistance determination section for determining travel resistance with a predetermined function in relation to said travel speed detected by said travel speed detecting section.

* * * * *